Figure 1:
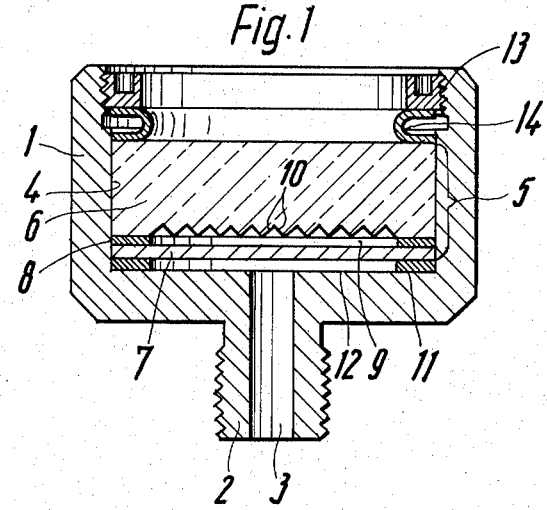

United States Patent [19]
Schittek

[11] 3,817,204
[45] June 18, 1974

[54] DEVICE FOR INDICATING CRITICAL TEMPERATURES

[76] Inventor: Friedrich Schittek, Passauer Strasse 39, 28 Bremen, Germany

[22] Filed: Jan. 9, 1973

[21] Appl. No.: 322,273

[30] Foreign Application Priority Data
Jan. 12, 1972 Germany............................ 2201203

[52] U.S. Cl................ 116/114 R, 73/17 A, 73/358, 116/70, 116/101, 116/103
[51] Int. Cl. .......................................... G01d 21/00
[58] Field of Search............ 116/114 V, 114.5, 101, 116/114; 73/356, 358, 345, 17 A, 339 R; 252/408

[56] References Cited
UNITED STATES PATENTS

| | | | |
|---|---|---|---|
| 3,107,529 | 10/1963 | Johnston, Jr...................... | 73/339 R |
| 3,162,849 | 12/1964 | Cunnien........................ | 116/70 UX |
| 3,163,045 | 12/1964 | Kaveckas et al.................. | 73/368.2 |
| 3,433,075 | 3/1969 | Sutherland........................... | 73/356 |
| 3,513,704 | 5/1970 | Hatcher ........................... | 73/339 R |
| 3,536,027 | 10/1970 | Neal.................................... | 116/103 |
| 3,568,628 | 3/1971 | Erickson............................ | 73/327 |

*Primary Examiner*—Louis J. Capozi
*Attorney, Agent, or Firm*—Allison C. Collard

[57] ABSTRACT

A device for indicating limiting temperatures of a fluid medium consisting of a hollow housing coupled to the medium and having a measuring compartment within the housing. Pressure cell or measuring compartment includes a stroke membrane or diaphragm and an evaporative liquid for sensing the temperature and pressure of the fluid. A visual indicator in contact with the evaporative liquid provides a visible indication only when a predetermined limiting temperature has been exceeded.

6 Claims, 2 Drawing Figures

DEVICE FOR INDICATING CRITICAL TEMPERATURES

The present invention relates to a device for indicating critical or limiting temperatures particularly sliding or variable temperatures dependent from an elevated temperature-pressure curve. The device contains a measuring box or pressure cell which is provided with an evaporative medium, a fixed wall portion, and a stroke membrane or diaphragm.

Since the boiling temperature of the liquid medium in the measuring box or pressure cell depends on the pressure exerted on the stroke membrane or flexible diaphragm, devices of this type permit sliding temperatures to be indicated along the pressure curve, and along the pressure of the boiling point. Therefore, a plurality of liquid mediums which are under different pressures may be controlled or regulated. The only requirement is that mediums be chosen which are slightly above or below the boiling-pressure curve of the liquid medium. If required, the liquid medium to be controlled may also be used as the evaporative medium. On the other hand, the temperature-pressure curve may be regulated independently from the boiling point of the medium to be controlled. This can be achieved by applying certain critical techniques.

Another application of such a device is in controlling balancing condenser filters to measure the flow of steam. In known devices, the temperature indication is carried out by the stroke movement of the membrane. The membrane is connected to mechanical or electrical indicators. However, it has been shown that such devices are rather expensive, and frequently subject to breakdowns. Very frequently when high pressures are involved, it has been shown that the packing, which controls the membrane stroke from the inside to the outside, breaks down. When electrical indicators are involved, it is also necessary to provide auxilliary electrical energy. Blackouts and defects in the electrical indicator may also cause erroneous readings.

It is therefore an object of the subject invention to provide a device of the above type which is more economical, and functions without frequent breakdowns. This is achieved by eliminating electrical or mechanical constructional elements.

In accordance with the subject invention, the fixed wall portion is in the form of an inspection glass. Indicator faces are provided within the measuring box or pressure cell in full view of the operator. The indicator faces are wetted, and cannot be seen when the evaporative liquid medium is below the critical temperature. When the temperature exceeds a critical value of the evaporative liquid medium, the indicator faces are readable. In other words, in the novel device, the different light refraction characteristics of the evaporative liquid medium are used during the liquid and vapor states in order to read the indicator. When the critical temperature has not been reached, that is, when the measuring box is still filled with liquid, the indicator can not be read. When the desired temperature is reached, the indicator faces are readable, that is, when steam vapor starts forming in the measuring box. The changing colors, and/or changes in the light intensity form the indicator signal.

An opaque liquid is preferred as the vaporizable evaporative medium and a differently colored medium material for the indicator faces. The indicator faces are set off with respect to the inspection glass within the measuring box. It is particularly advantageous to use the faces of the membranes which are turned toward the inspection glass as indicator faces. By placing the indicator faces a certain distance away from the inspection glass, the evaporative liquid medium can penetrate between the indicator faces and the inspection glass. At that point, the indicator faces are covered by the opaque liquid medium and are not visible in the inspection glass when the temperature is below the limit value. Since vapor is colorless, and not visible when the limiting temperature is reached, the indicator faces are visible above the limiting temperature due to the reflection of incident light. Therefore the color and/or light change between evaporative liquid medium and the indicator liquid form the indicator signal. A propanol which is colored with amido black may be used as the opaque evaporative liquid medium.

The faces of the membranes which are turned toward the inspection glass may be coated with chrome or a luminescent coating. In this case, the indicator faces would favorably contrast with respect to the evaporative liquid medium. Instead of the indicator faces, the opaque liquid may be provided with luminescent coloring.

In accordance with another embodiment of the invention, glass faces which are inclined toward the inspection glass may be used as indicator faces. These glass faces would be transparent when the temperature limit value has not been reached, so that the membrane opposite to the inspection glass remains visible due to the dark color of the membrane. When the temperature limit is exceeded, the glass face becomes visible as a white body due to the formation of steam. A particular advantage with this embodiment is that the indicator faces are provided on the inside of the inspection glass.

A particularly high sensitivity of the device may be obtained when the volume of the evaporative liquid medium is made relatively small. In accordance with the subject invention, the inner space of the measuring box is so small, so that the evaporative liquid medium forms only a fine film in the inner space of the measuring box.

Figure 2:
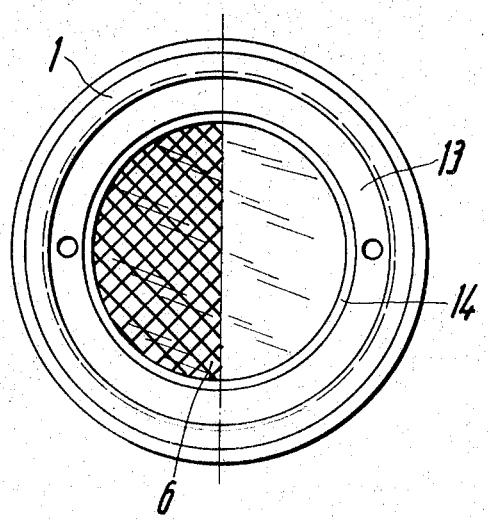

In the attached drawing, wherein similar reference characters denote similar elements in the two views:

FIG. 1 is a cross-sectional view of a device for indicating a limiting temperature according to the invention, and FIG. 2 is a plan view of the device of FIG. 1.

In FIGS. 1 and 2, a housing 1 is provided with a joining or coupling socket or fitting 2 which has a central measuring bore 3. A receiving space 4 is provided with a measuring box 5. Pressure cell 5 consists of an inspection glass 6 in the form of a fixed wall portion, and a stroke membrane or flexible diaphragm 7. A packing ring 8 is mounted between the edges of the inspection glass and the stroke membrane. The inner space 9 which is formed between inspection glass 6 and stroke membrane 7 is filled with an evaporative vaporizor liquid medium. Furthermore, indicator faces 10 are provided in inner space 9 on the inner side of the inspection glass. These faces are preferably formed a distance away from the top of the glass. For this purpose, the innerside of the inspection glass is prismatic. The indicator face may also be a chrome layer deposited on the stroke membrane.

A packing ring 11 is mounted between the pressure cell or membrane edge and bottom face 12 to pack and seal the measuring box in receiving space 4. A screw ring 13 is threaded into the top of housing 1, and provides the required pressure on parts 6, 7, 8 and 11. The screw ring presses against inspection glass 6 by means of a spring ring 14.

To control a steam line where a boiling point is reached, housing 1 is screwed into the line (not shown) by means of fitting 2. The liquid medium to be controlled flows through the measuring bore 3 to the lower side (i.e., the outer face) of membrane 7. From there, the pressure and temperature of the medium are transmitted through to the evaporative medium in the inner space 9 of measuring box 5. In this case, propanol may be used as the evaporative liquid medium, because the boiling temperature-pressure curve is somewhat below the corresponding curve of the condensate.

As long as the cooler condensate contacts stroke membrane 7 and has not reached the boiling temperature of the evaporative liquid medium, the reflection faces 10 of inspection glass 6 are wetted by the evaporative liquid medium. In this way, the light which enters measuring box 5 is transmitted to the darker colored membranes 7, without being reflected from indicator faces 10. Membrane 7 is thus visible in the inspection glass as a dark field or face. The left side of FIG. 2 of the inspection glass shows this condition. When the condensate reaches its boiling temperature, the evaporative liquid medium in the pressure cell or measuring box also reaches the boiling temperature, whereby the latter also evaporates. At this point, the indicator faces 10 are no longer wetted by the liquid, but are contacted by the vapor or steam. Thus, a total reflection of incident light is obtained on the indicator faces and they appear as white faces, as shown in the right side of the inspection glass in FIG. 2.

This change in light forms the indicator signal. In order to prevent an overextension of the membrane during overheating elevated heating of the evaporative liquid medium, bottom face 12 of receiving bore 4 serves as a support for stroke membrane 7 during in the arched condition.

While only a few embodiments of the present invention have been shown and described, it will be obvious to those persons skilled in the art that many changes and modifications may be made thereunto without departing from the spirit and scope of the invention.

What is claimed is:

1. A device for indicating a pressure-dependent variable temperature limit of a controlled fluid medium with an established pressure-temperature curve which comprises:
    a pressure cell containing a vaporizable fluid and provided with
    an inspection glass wall portion;
    indicator face means exposed to said vaporizable fluid and in a location within said cell within the field of vision through said inspection glass; and
    a flexible diaphragm wall portion having its inner face in contact with said vaporizable fluid and its outer face in contact with said controlled fluid medium;
    whereby said indicator face means is in contact with said vaporizable fluid in the liquid state and not visible through said inspection glass at temperatures below said limit temperature, and said indicator face means is in contact with the vapor of said vaporizable fluid and visible through the inspection glass at temperatures above said limit temperature.

2. The device as recited in claim 1 wherein said vaporizable fluid comprises an opaque colored liquid having a contrasting coloration with respect to said indicator face means and, said indicator face means is spaced apart from the inspection glass within said measuring compartment.

3. The device according to claim 1 wherein said indicator face means comprises the face of diaphragm directed toward said inspection glass.

4. The device according to claim 1 wherein said face means comprises a chrome layer formed on the surface of said diaphragm directed toward said inspection glass.

5. The device according to claim 1 wherein said face means comprises a luminescent coating formed on said diaphragm.

6. The device according to claim 1 wherein said vaporizable fluid comprises a propanol colored with amido black.

* * * * *

UNITED STATES PATENT OFFICE
CERTIFICATE OF CORRECTION

Patent No. 3,817,204      Dated June 18, 1974

Inventor(s) Friedrich Schittek

It is certified that error appears in the above-identified patent and that said Letters Patent are hereby corrected as shown below:

The entire rights of this patent are assigned to:      Gustav F. Gerdts KG Bremen, Germany

IN THE ABSTRACT:

Line 1, after "indicating", insert --or--.

Line 4, before "Pressure", insert --The--.

Col. 1, line 62, delete "steam".

Col. 1, line 66, after "colored", delete "medium",

Col. 2, line 60, after "evaporative", insert --or--.

Col. 3, line 1, delete "pressure cell or".

Col. 3, line 3, before "measuring",
        insert --pressure cell or--.

Col. 3, line 40, delete "overheating",

IN THE CLAIMS:

Claim 3, line 2 before "diaphragm", insert --said--.

Signed and sealed this 8th day of October 1974.

(SEAL)
Attest:

McCOY M. GIBSON JR.
Attesting Officer

C. MARSHALL DANN
Commissioner of Patents